April 15, 1930.  W. E. SWERN  1,754,583
TIRE BUILDING MACHINE
Filed Aug. 23, 1926  2 Sheets-Sheet 1
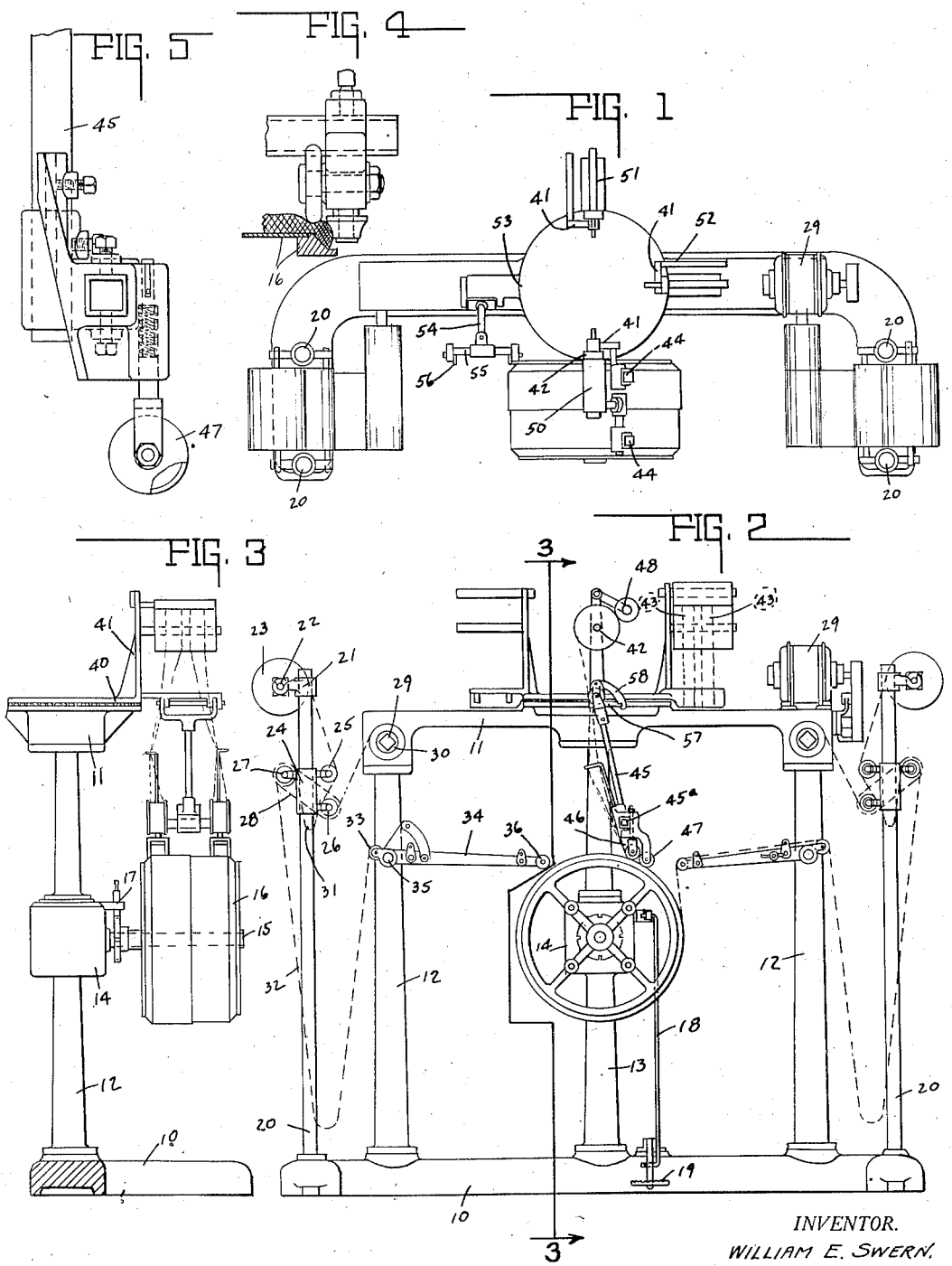
INVENTOR.
WILLIAM E. SWERN.
BY
Lockwood & Lockwood
ATTORNEYS.

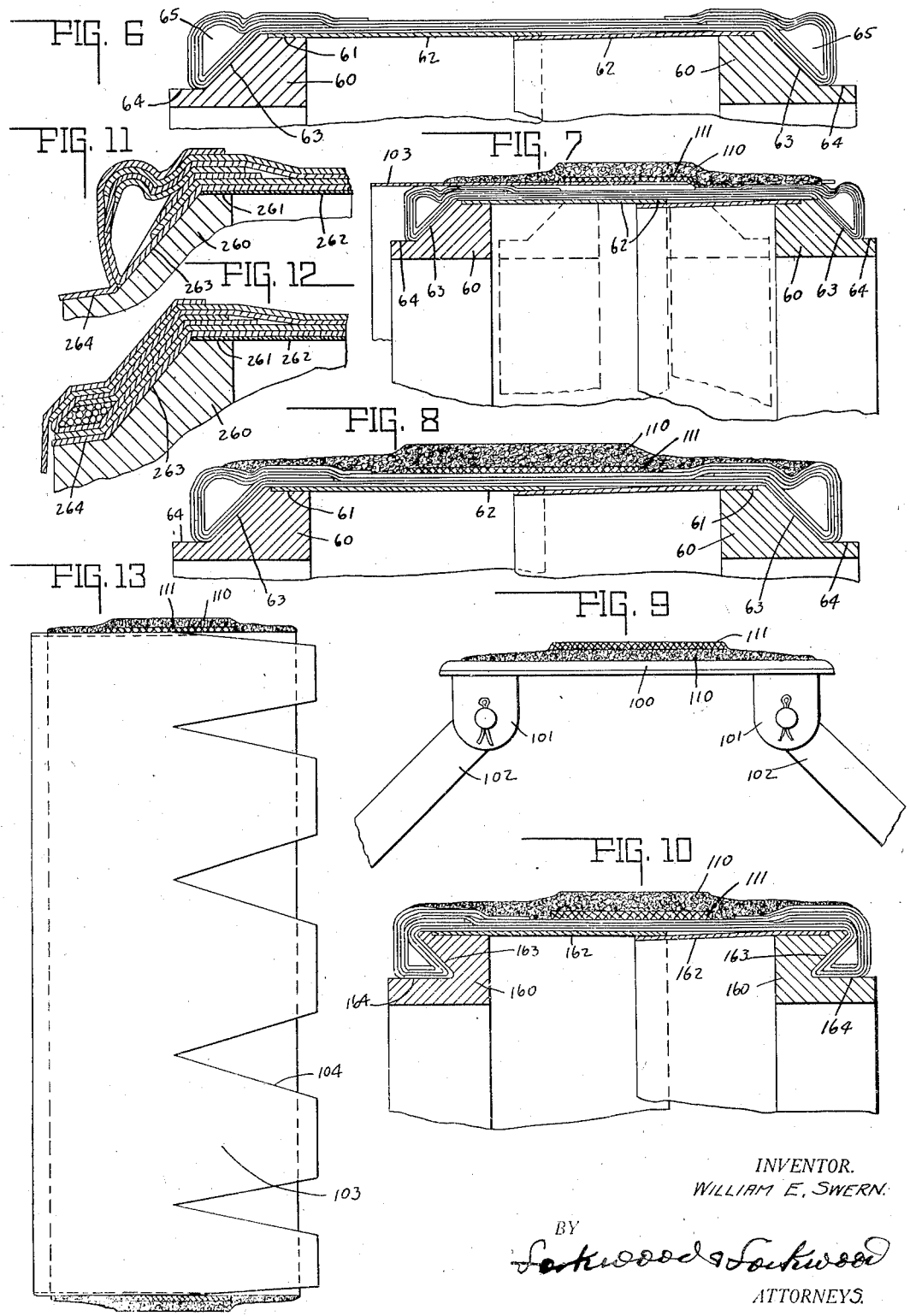

Patented Apr. 15, 1930

1,754,583

UNITED STATES PATENT OFFICE

WILLIAM E. SWERN, OF KOKOMO, INDIANA, ASSIGNOR TO THE GOODYEAR TIRE & RUBBER COMPANY, OF AKRON, OHIO, A CORPORATION OF OHIO

TIRE-BUILDING MACHINE

Application filed August 23, 1926. Serial No. 130,883.

This invention relates to a drum type tire building machine and is a continuation in part of the copending application Serial No. 723,353, filed June 30, 1924 and entitled Full drum type tire and process of forming same.

The chief object of the invention is to construct a building machine, whereby drum type tire casings may be most expeditiously formed and when substantially completed removed from the drum for subsequent formation into tire casing form and curing.

The present invention contemplates the production of drum type tire casings, either clincher or straight side, by a semi-flat drum, and the simultaneous application of a plurality of plies of tire casing forming material which when corded, is applied in biased relation and biased with respect to each other, the semi-flat drum permitting the employment of fabric strips which are substantially identical.

The full nature of the invention will be understood from the accompanying drawings and the following description and claims:

In the drawings Fig. 1 is a top plan view of a drum type tire casing building machine. Fig. 2 is a front elevation thereof. Fig. 3 is a vertical section of the same taken on line 3—3 of Fig. 2 and in the direction of the arrows. Fig. 4 is an elevational view of a stitching mechanism. Fig. 5 is a side elevation of a bead spacing mechanism. Fig. 6 is an enlarged central section of the tire casing previous to the application of the tread and breaker strip. Fig. 7 shows the same parts with the tread and breaker strip applied and the means for so doing. Fig. 8 is a view similar to Fig. 6 of the completed tire prior to removal thereof from the drum, the latter being accomplished by movement of the parts to the position shown by the dotted lines in Fig. 7. Fig. 9 is a transverse sectional view of the drum for forming the tread and breaker strip in reversed relation. Fig. 10 is a view similar to Fig. 8 but of a straight side tire, Figs. 6, 7 and 8 illustrate clincher type tires. Fig. 11 is a section showing parts of a semi-flat drum upon which is formed the clincher type tire. Fig. 12 is a similar view of the same drum upon which is formed a straight side tire. Fig. 13 is the transfer cylinder with the tread and breaker strip thereon.

The present invention relates to a machine for forming a tire casing upon a drum and which casing after formation, is subjected to deformation and curing to form a completed tire casing. The present machine is of a character which permits the application of similar widths of fabrics to the same tire and the simultaneous application of a plurality of said strips and with biased cords in biased relation. The present invention also includes means for forming, when desired, a breaker and tread portion separate from the body portion of the tire casing, and thereafter the application of said portions to the tire casing in a condition which subsequent deformation (required for tire casing formation) does not adversely affect the breaker strip.

The present disclosure is substantially that of the copending application Serial No. 725,353 filed June 30, 1924, with the following differences: Herein but a single building machine is illustrated, whereas the aforesaid application discloses a multiple building machine and herein a revolving turret is employed as a mounting for the bead rolling and the flipper and chafing strip mechanisms and also the formation of a semi-flat drum intermediate between the straight and clincher type drums whereby clincher and straight side tires can be formed on the same drum.

It has long been the practice in the production of tire casings for automobile and bicycle tires to form the casings in cylindrical arrangement and thereafter deform and cure the same in tire casing formation by pneumatically expanding or contracting, or both, the cylindrical casing into the desired form, or mechanically securing such deformation and simultaneously therewith or thereafter, curing the deformed casing into its permanent form and condition or by a combination thereof.

The present invention is directed to means for most expeditiously forming a drum type tire casing.

10 indicates a U-shaped base and positioned above the same is a super-base 11, the same being connected by end standards 12 and middle standard 13. Projecting laterally of the middle standard 13 is a support 14 for a drum spindle 15 carrying the drum 16. A suitable clutch is associated with the spindle and the drum is rotated through power means controlled by a link 18 terminating in a foot lever 19. Lock 17 holds the shaft stationary for telescoping the drum.

Positioned at each side of the drum and supported by the U-shaped frame 10 are a plurality of standards 20, said standards supporting in superposed relation suitable mechanism. A pair of brackets 21 rotatably support a roll spindle 22 upon which is mounted a roll 23 of fabric, preferably biased cord material including a liner. Positioned therebeneath in the brackets 24 is guide roll 25 the strip roll 26 and the guide roll 27, guide roll 27 and stripping roll 26 being power operable through sprocket chain 28 driven by main motor 29 mounted on the base 11. Projecting laterally from the base 11 adjacent the standard 12 is a roll supporting spindle 29 receiving the roll support 30. The biased corded fabric is unwound from roll 23 passes over guide roller 25 and the liner passes under roll 26 and is wound upon roll 30. The corded fabric loops below the roller 26 as at 31, then passes over the roller 27 and downwardly into the larger loop 32 and thence upwardly over a roller 33 and thence through a guide mechanism 34 pivotally mounted at 35 on the vertical support 12 and adjustably mounted thereon. The material after passing over the end roller 36 engages the drum. The liner receiving roll 30 is power operable and thus power is transmitted through roll 26 and sprocket chain 28 to the guide roll 27.

On the opposite side of the drum is positioned a similar construction and the rollers 36 of each terminate adjacent the drum in spaced relation with each other leaving a gap therebetween. The result therefore is that the stock guides 34 can be raised and lowered to suit the height of the drum and one seat can be so positioned that the operator can work at the face of the drum. The resultant construction also permits the simultaneous application of two plies of fabric and these in biased relation to each other although the rolls are identical since they are applied from opposite directions of the drum. The corded material including the liner is run through the several rolls which are operated as aforesaid, and the liner is rolled up by power which pulls the cord material loose from said liner. Since the corded material when separated from the liner hangs in a loop the stock need not be rolled accurately for the material thereafter passes through the centering guides and on to the drum, said material centering itself as it lies in the loop and enters the centering guides. Furthermore, the material when applied to the drum is practically under no tension for all of the tension has been relieved through the loop since the separation between the liner and the corded fabric has occurred previous to the formation of the loop. In other words, the elasticity of the rubber coating on the cords never has an opportunity to stretch unduly or before reaching the drum. The corded material as now applied is pulled through from the supply roll and the liner rolled therefrom. Said material has a tendency to change its bias and each different roll has a different bias by reason of non-uniform tension, and there is no certainty that successive plies or rolls have the same bias. Since all tension is substantially eliminated by the present arrangement, except that due to gravity in the loop, the present machine permits the simultaneous application of two plies at the same time and the machine is so arranged that there is an opening between the applications of the several plies so that the first ply can be torn off or otherwise operated upon before said ply reaches the stage of application or position of application in the second ply.

Rotatably mounted on a vertical axis substantially transverse to and intersecting the drum axis, is a turn-table 40 adapted to be clamped in any one of a plurality of positions. Extending upwardly from said turn table and suitably secured thereto are the uprights or brackets 40, and herein four of the same are illustrated. Each of the brackets supports a roll 42 carrying two strips side by side thereon and said strips indicated by the numerals 43 unwind from the roll and pass through the guides 44 carried by the depending pivotally supported arms 45 through the feeding guides and adjacent rolls 46 and 47. Pivotally supported adjacent the main roll 42 is the receiving roll 48 which takes the liner. In Fig. 1 the roll indicated by the numeral 50, carries the flipper strips which are positioned under the beads. 51 is the roll constituting the flipper strips over the beads and 52 is the roll providing the chafing strips.

The fourth bracket, designated by the numeral 53, pivotally and adjustably supports an arm 54 similar to arm 45 and said arm terminates in a transverse member 55 carrying a plurality of bead setting devices in the form of rollers 56. These simultaneously seat and space the beads on the drum. The strip spacers simultaneously space the two strips on the drum the proper distance apart and in the predetermined position.

The arms 45 and 54 are adapted to be positioned in either the depending horizontal or vertical positions and secured therein through the segment 57 and pawl or tooth 58. The transverse members 55 and 45ª are adjusted with reference to the diameter of the drum employed through the adjustability of the mounting thereof on the respective rods 54 and 45.

The drum construction which is novel per se, consists of a pair of annular members 60 provided with a peripheral face 61 recessed to receive a cylindrical member 62, said cylindrical members being telescopically associated. In this way any width of drum surface can be obtained for any given drum diameter. Each of the circular members 60 includes an inclined face 63, the faces being oppositely inclined to each other and being relieved or tapered as at 64. The drum is suitably supported upon the spindle 15 and is rotated thereby. The inclined face 63 and relieved portions 64 permit the bead 65 of the tire to lie substantially below the main body portion thereof when formed on the drum. The particular form of tire illustrated herein is described and claimed in the copending applications Serial No. 723,353 and No. 30,261.

The resultant construction is that the drum is adjustable in width for any size of tire having a given bead diameter whether the same be either straight side or clincher.

Figs. 6 to 8 inclusive, illustrate the drum employed solely with clincher tires, and Fig. 10 illustrates the drum employed solely with straight side tires. In this drum the similar parts are numbered with the 100 series. Thus, the inclined face is numbered 163, telescoping tubes 162, drum frame or edge 160 and the relieved face 164.

Figs. 11 and 12 show the same drum, in the first instance receiving a clincher construction and in the second instance receiving a straight side tire construction. In this form the drum parts are indicated by the 200 series, 262 indicating the tubular portions telescopically associated together. The frame or end member 260 has an inclined face 263 and a relieved face 264.

With this telescopic arrangement it is possible to make a given tire heavier or lighter if so desired. By widening the drum, the tire will have more air space and require lighter gage material for filling the mould cavity, while for the heavier tire the reverse would be true. Another advantage obtainable with the present drum construction is that since the plies of material turn down over the beveled edge 63—163 or 263, each successively applied ply will have additional width at the bevel portion. Thus, when the tire casing is built in the semi-flat as herein shown, and drawn into tire casing formation by expanding the central portion of the plies, several plies at the clincher portion will not be elongated very much and thus there is relieved strains that otherwise would be incorporated therein if the material were built entirely on the flat drum. Also where straight side tires are built on the full flat drum, the material used for the bead is of such a gage that the outer portion of the bead would be larger than the carcass of the tire. This is not the case with the semi-flat drum process disclosed, for in this instance as shown herein, the crown of the tire is always above the outer diameter of the bead. Another feature that the semi-flat drum tire process possesses over the flat drum process is that when the beads are set they are always set in the same position, the spacing remaining constant and the tires are always uniform in cross section which eliminates all chances of pinching beads.

In Figs. 7 and 13 an additional apparatus is disclosed and the same includes a drum 100 having the ears 101 and said drum is sectionalized and is expanded or contracted as desired by toggle linkage 102. Positioned on said drum is the tread portion 110 and superimposed thereon is the breaker strip 111. The drum is expanded to the diameter that the breaker strip is to have when in the tire casing formation and it is then applied to the tread. Thereafter the drum is contracted and by reason of the resiliency in the tread rubber, the breaker strip contracts with it. After the breaker strip has been applied in the tread in the expanded position and thereafter contracted by the latter, the combination is removed from the drum 100 and applied inverted to the cylindrical transfer member 103 having the cut out or serrated portions 104, leaving spaces through which the rubber is exposed. The foregoing combination tread and breaker is applied to the transfer device in its normal position and at the contracted diameter. The shell 103 is then telescopically associated with the drum as shown clearly in Fig. 7 and the tread stitched down on the cord previously applied to the drum. After the same has been stitched down the transfer device or shell 103 is removed, the portions of the tread exposed through the openings 104 and the cord being sufficient to restrain the tread in position thereon. After the shell has been removed the entire tread is stitched down. The two ring members 60 are then brought towards each other so that the beads may be worked over the ends and the semi-flat drum type casing removed from the drum. The casing is then expanded and cured in the expanded position.

The invention claimed is:

1. In a machine of the character described, the combination of a drum rotatably mounted, a fabric roll support, a liner support, power means for rotating the liner support for separating the liner from the fabric, and guiding and spacing means interposed between the drum and said supports for looping the fabric after liner separation for insuring substantially uniform stress therein.

2. A device as defined by claim 1, characterized by the addition of idler roll means interposed between said supports including a plurality of rolls mechanically connected for synchronous operation between which the lined fabric passes before separation.

3. In a tire building machine, the combination of a rotatably mounted drum, a plurality of fabric supports mounted adjacent thereto, and means for applying in offset relation a plurality of fabrics simultaneously to the drum.

4. A device as defined by claim 3, characterized by the addition of means for supplying said fabric under substantially uniform stress condition.

5. A device as defined by claim 3, characterized by the machine including means for running a constant bias and tension relationship when employing corded biased fabric.

6. In a machine for building tires of the character described, the combination of a rotatable drum, a pair of guides positioned adjacent thereto in spaced relation with each other, and a roll support adapted to simultaneously support a pair of rolls of strip fabric and simultaneously supply said guides therewith for simultaneous positioning thereof on said drum.

7. A device as defined by claim 6, characterized by said fabric strip guiding means being adjustably mounted for positioning towards and away from said drum.

8. A device as defined by claim 6, characterized by said fabric strip guiding means being adjustably mounted for movement towards and away from each other.

9. A device as defined by claim 6, characterized by said fabric strip guiding means being adjustably mounted for positioning towards and away from said drum, and being adjustably mounted for movement towards and away from each other.

In witness whereof, I have hereunto affixed my signature.

WILLIAM E. SWERN.